United States Patent Office 3,458,483
Patented July 29, 1969

3,458,483
PRODUCTION OF HIGH MOLECULAR WEIGHT MATERIALS
George Jon Dubsky, Cambridge, and Bernard Peter Stark, Stapleford, England, assignors to Ciba Limited, Basel, Switzerland, a Swiss company
No Drawing. Filed Apr. 20, 1964, Ser. No. 361,292
Claims priority, application Great Britain, Apr. 26, 1963, 16,577/63
Int. Cl. C08f 1/28
U.S. Cl. 260—78.3                                       6 Claims

ABSTRACT OF THE DISCLOSURE

Compositions suitable for the production of high molecular weight are provided by the combination of a compound or mixture of compounds containing no 1,2-epoxide group but capable of being transformed to a higher-molecular weight material under the influence of a cationic catalyst, and at least one chelate compound in which the coordinating atom is bound by one or more of its valencies to a fluorine, chlorine or bromine atom, and by one or more of its valencies to an oxygen or sulphur atom.

---

This invention relates to high molecular weight materials and to processes for production of such materials.

According to one aspect of the present invention there are provided compositions comprising a compound or mixture of compounds containing no 1,2-epoxide group but capable of being transformed to a higher-molecular weight material under the influence of a cationic catalyst, and at least one chelate compound in which the coordinating atom is bound by one or more of its valencies to a fluorine, chlorine or bromine atom, and by one or more of its valencies to an oxygen or sulphur atom.

According to a preferred embodiment of the invention, the chelates of the present invention conform to the general Formula I:

$$[Z'[\phantom{-}\underbrace{[-Z\diagdown_{Y}^{Z}\diagup A(\text{hal})_n]}_{m}\phantom{-}]_{m'}] \quad \text{(I)}$$

wherein A represents a coordinating atom, hal represents a fluorine, chlorine or bromine atom, X represents oxygen or sulphur, Y represents oxygen or sulphur doubly bonded to Z, or nitrogen, the remaining valencies of the nitrogen atom, if a nitrogen atom be present, being satisfied either by a divalent atom or group, such as an alkylene group, or by two monovalent atoms or groups such as hydrogen atoms, hydrocarbyl groups or acyl groups, or as to one valency, by linkage to one such monovalent atom or group, and, as to the remaining valency, by forming part of a double bond joined to an atom present in Z, Z represents an organic group linking the atoms X and Y such that the number of consecutive atoms linking X and Y is not less than 2 nor more than 4, $m$ represents 1, 2 or 3, $n$ is an integer from 1 to 4, and Z' is hydrogen or an organic metal-containing organic group of valency $m'$, where $m'$ is 1 or 2.

The coordinating atom A may be, for example, boron, in which case hal is preferably fluorine, or aluminium, zinc, ferric iron, stannic tin, zirconium, vanadium, titanium, or antimony in which case hal is preferably chlorine. A is preferably boron or aluminium.

An especially preferred class of chelate compounds useful in the compositions of the present invention conforms to the general Formula II:

$$\left[\begin{array}{c} R \\ | \\ Q-C\diagup_{\diagdown}^{\diagup C-O}\diagdown_{A(\text{hal})_n} \\ \phantom{Q-C}\diagdown_{C=O}\diagup \\ \phantom{Q-C}| \\ \phantom{Q-C}P \end{array}\right]_m \quad \text{II}$$

wherein A represents a coordinating atom, hal represents fluorine, chlorine or bromine, P, Q and R represent hydrogen or halogen or monovalent organic residues with the provision that any two of P, Q and R may together represent a single divalent organic residue, and one of P, Q and R may be a divalent residue joining two residues of the general formula given above omitting one of P, Q and R, $n$ is an integer from 1 to 4, and $m$ is 1, 2 or 3, the value of $2m+n$ being the coordination number of the atom A. In Formula II P, Q, and R may, for example, represent aliphatic, cycloaliphatic, araliphatic, or aromatic hydrocarbon residues, alkyl or alkoxy groups, acyloxy groups, or alkylamino or acylamino groups. Preferably P represents hydrogen, alkyl of 1 to 6 carbon atoms, phenyl, acyloxyphenyl, halophenyl, phenylamino, or halophenylamino, or a phenylenebisamino radical joined to two radicals of the formula:

$$\left[\begin{array}{c} \phantom{Q-}C-O\diagdown \\ Q-C\diagup_{\diagdown}^{\diagup}\phantom{-}A(\text{hal})_n \\ \phantom{Q-C}\diagdown_{C=C}\diagup \\ \phantom{Q-C}| \\ \phantom{Q-C}R \end{array}\right]_m$$

Q represents hydrogen or an alkyl, alkenyl, or alkoxy-carbonyl radical of 1 to 6 carbon atoms, or an aralkyl radical, and R represents hydrogen or an alkyl radical of 1 to 6 atoms or a phenyl radical, or any two of P, Q and R together represent a tri- or tetra-methylene radical and P, Q or R (as the case may be) is as first defined.

The most preferred compounds of Formula II are those in which P is methyl or ethyl, Q is hydrogen, and R is a monovalent group, e.g. a phenyl or arylamino group.

Examples of preferred compounds within the class of Formula II are those of the structures:

IIA, IIB, IIC, IID, IIE

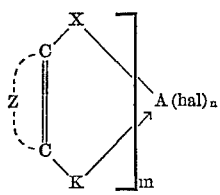

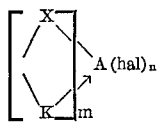

Another especially preferred class of chelate compounds useful in the compositions of the present invention conforms to the general Formula III $$\left[ \begin{array}{c} X \\ C \\ Z \\ C \\ K \end{array} \right]_m A(hal)_n \quad III$$

wherein A represents a coordinating atom, hal represents chlorine, fluorine or bromine, X represents oxygen or sulphur, Z with the two adjacent carbon atoms represents an aromatic nucleus which may be substituted and may be joined to a second $$\left[ \begin{array}{c} X \\ / \\ \\ K \end{array} \right]_m A(hal)_n$$

unit via a second pair of vicinal carbon atoms, R represents an organic radical containing an oxygen, sulphur, or nitrogen atom coordinated to atom A and joined, either directly or via a single other atom, to the indicated carbon atom of the aromatic nucleus, n is an integer from 1 to 4 and n is 1, 2 or 3, the value of $2m+n$ being the coordination number of the atom A. Z with the two adjacent carbon atoms preferably represents a benzene or naphthalene residue and K is preferably an acyl or alkoxycarbonyl radical of 1 to 6 carbons, a nitroso or nitro group, a carboxylic acid group, an acylamino group of 1 to 6 carbons, an aracylamino group, or an —CR$^1$:NR$^2$ group (where R$^1$ is hydrogen or an alkyl group of 1 to 6 carbons and R$^2$ is an aryl group).

The most preferred compounds of Formula III are those in which X is oxygen, Z with the two adjacent carbon atoms represents a benzene residue, and K is acetyl, methoxycarbonyl, or nitro.

Examples of preferred compounds within the class of general Formula III are those of the structures:

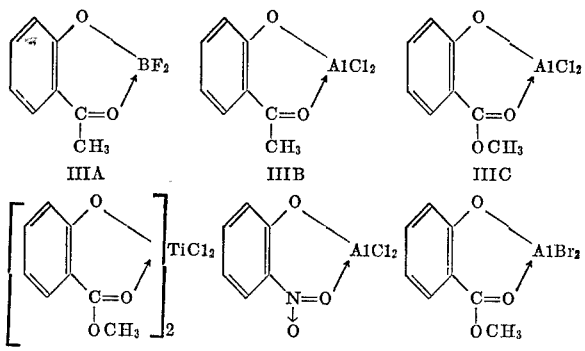

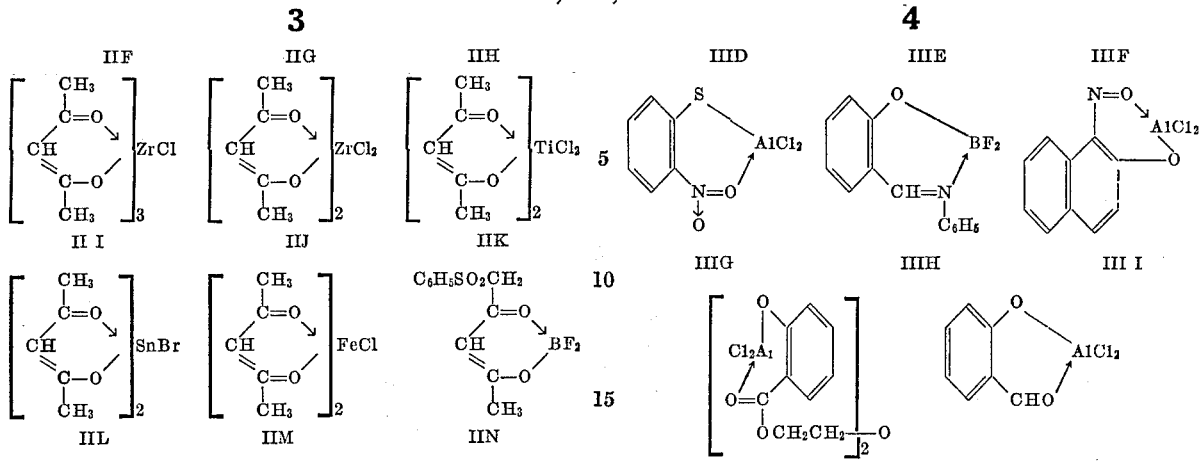

Chelates containing more than one coordinating atom, such as the complex formed by the reaction between nickel dimethylglyoxime and boron trifluoride, and those formed between 2 molecules of a halide containing the coordinating atom and one molecule of an ortho,ortho'-disubstituted methylene-bisphenol in which the two ortho-substituents may be the same or different and have the same meanings as are assigned above to K in Formula III, may also be used in the compositions of the invention.

The chelate compounds of general Formula I may be regarded as being formed by the elimination of hydrogen halide from a halide of the coordinating atom and a chelating substance. Examples of chelate-forming substances are phenols substituted in the ortho-position by a group K where K is as hereinbefore defined and diketones, especially β-diketones. Suitable ortho-substituted phenols include o-hydroxyacetophenone, o-nitrophenol, 2,4-dinitrophenol, 1-nitroso-2-naphthol, o-nitrothiophenol, o-hydroxyacetanilide, salicylic acid, salicylic aldehyde, and methyl salicylate. Suitable β-diketones include benzoylacetone, p-acetoxybenzoylacetone, dibenzoylmethane, hexane-2,4-dione, heptane-2,4-dione, dipropionylmethane, dicaproylmethane, 2 - acetylcyclohexanone, and 3-alkyl- or 3-alkenyl-pentane-2,4-diones, such as 3-allylpentane-2,4-dione.

The chelates of the present invention may be prepared from a halide of the coordinating atom and either a chelate-forming compound, or two or more reactants which together yield the desired chelate-forming compound. Thus, the complex of Formula IV

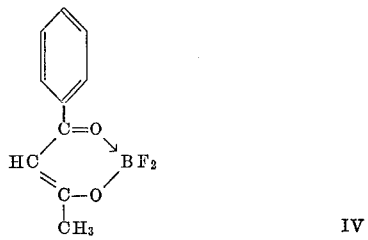

may be prepared by the reaction, in an inert solvent, of boron trifluoride with either benzoylacetone or a mixture of acetophenone and acetic anhydride.

The chelates may be present in the compositions of the present invention in an amount of 0.01 to 20% by weight of the substances which are to be transformed to high molecular weight materials. The transformation may be performed in bulk or in solution in an inert solvent; the chelates may be added as such, or they may first be dissolved in the same or a different solvent before addition to the transformable substances. This transformation, which represents a further feature of the invention, may be performed at low, moderate or elevated temperatures, e.g. within the range −120° to +200° C.

The compounds which may be transformed into higher molecular weight materials under the influence of the aforesaid chelate compounds may be divided into three main classes.

The first class comprises compounds containing one or more groups which are capable of undergoing homo- or co-polymerization under the influence of cationic catalysts. Such groups include for example polymerisable double bonds, heterocyclic rings such as oxetane rings, tetrahydrofuran rings or cyclic formals, acetals or ketals. Examples of compounds containing polymerisable double bonds are: simple olefines such as ethylene, propylene, but-1-ene, but-2-ene, isobutylene, amylenes and hexylenes, tetramethylethylene, diisobutylene etc., halogen-containing olefines such as 3,3,3-trifluoropropene and 2-methyl-3,3,3-trifluoropropene; cycloolefines such as cyclopentene, cyclohexene, bicyclo (2,2,1) hepta-2,5-diene, dicyclopentadiene, and acenaphthylene; vinyl or allyl derivatives of alicyclic, carbocyclic, or heterocyclic compounds such as 4-vinylcyclohex-1-ene, styrene, α-methylstyrene, α-p-dimethylstyrene, allylbenzene, 2,6-dimethyl-4-tert-butylstyrene, divinylbenzene, p-isopropenyltoluene, vinyldiphenyl, vinylpyrene, N-vinyl-2-pyrrolidone, 2-vinyldibenzofuran, N-vinylpyrrole, N-vinylcarbazole, and 2-vinylfuran, vinyl ethers such as vinyl methyl ether, vinyl isobutyl ether, vinyl isoamyl ether, vinyl phenyl ether, vinyl hexyl ether, vinyl tetrahydrofurfuryl ether, and vinyl ethers of di- or polyhydroxy compounds such as ethylene glycol divinyl ether. compounds containing two conjugated ethylenic bonds, such as butadiene, isoprene, piperylene, 2,3-dimethylbutadiene, alkoxyprenes, cyclopentadiene, methylcyclopentadiene, butadienyl ethers such as butadienyl methyl ether, butadienyl butyl ether etc., cyclic or acyclic terpenes such as allo-ocimene, ocimene, myrcene, α- and β-pinenes, dipentene, limonene, and squalene.

Other unsaturated compounds in this class include: unsaturated fatty acids and their esters, anethole, indene, compounds containing norborene units, allyl esters and ethers, acrylonitrile, other derivatives (such as esters and amides) of acrylic or methacrylic acids, acetylenic compounds, p-quinodimethane, drying oils and the corresponding fatty acids, α,β-unsaturated ketones and aldehydes, stilbene, vinyl sulphides, vinyl acetals, formals and ketals, vinylphosphonates, vinyl halides, N-vinylamines, and N-vinylsultams, Compounds containing heterocyclic rings which may be polymerised include: oxetanes such as oxacyclobutane, 3,3-bis(chloromethyl)-1-oxacyclobutane, 3-hydroxy-methyl - 3 - methyl-1-oxacyclobutane, oxacyclobutane, 3,3-dimethyl-1-oxacyclobutane, perfluoroalkyloxetanes, 3-alkoxy-3-halomethyl-1-oxacyclobutanes, 3-methyl-3-chloromethyl-1-oxacyclobutane, 3-hydroxymethyl-3-halomethyl-1-oxacyclobutanes, and 3,3-bis((bromomethyl)-1-oxacyclobutane; compounds containing more than one oxetane group per molecule may also be used in the composition of the invention. These include, for example: 2,6-dioxaspiro(3,3)heptane, reaction products of di- or polyfunctional phenolates with 3-alkyl-3-halomethyl-1-oxacyclobutanes, reaction products of dioxaspiroheptane with dicarboxylic acids or their anhydrides, and the esters of di- or poly-carboxylic acids with 3-alkyl-3-hydroxymethyl-1-oxacyclobutanes. Compounds containing, besides one or more oxetane groupings, an additional different group capable of undergoing cationic polymerisation may also be used. Such compounds include for example the esters of 3-alkyl-3-hydroxymethyl - 1 - oxycyclobutanes with acrylic acid.

Other heterocyclic compounds capable of polymerisation under cationic conditions include: compounds containing one or more tetrahydrofuran rings such as tetrahydrofuran and tetrahydrofurfuryl alcohol and its esters with mono- or poly-carboxylic acids or its ethers with alcohols; cyclic vinyl ethers such as 2-vinyl-1,4-dioxan or compounds containing one or more dihydrofuran or dihydropyran rings; 1,3-dioxalanes or other cyclic acetals, trioxan, trithiane, cyclic lactones, thiophen derivatives, benzofuran, 1,4-dioxan, ethylenimine derivatives, cyclic phosphites, cyclic organosilicon compounds, and diketene.

Aldehydes such as formaldehyde, acrolein (or its dimer) acetaldehyde and furfural may also be used as compounds capable of transformation to higher molecular weight materials in the compositions of the invention, as also may be isocyanates, iminocarbonates and nitriles.

Preferred compounds of this first class are those containing at least two vinyl ether groups, especially cyclic vinyl ether groups, and more particularly those wherein the cyclic vinyl ether groups each form part of a 3,4-dihydro-2H-pyran nucleus. The materials most particularly preferred are (3,4-dihydro-2H-pyran-2-yl)methyl 3,4-dihydro-2H-pyran-2-carboxylate and prepolymers thereof.

The second class of compounds which may be included in the compositions of the invention comprises those compounds which, under the influence of the aforesaid chelate catalysts, liberate volatile materials with consequent formation of higher molecular weight material. Such compounds include, for example, compounds containing one or more aromatic rings bearing one or more halomethyl groups from which a hydrogen halide may be eliminated to give higher molecular weight compounds possessing methylene bridges between their aromatic nuclei. Yet other compounds, such as alkyl ketones, may under the influence of cationic catalysts liberate water to give high molecular weight compounds.

The third general class of compounds which may be transformed to higher molecular weight materials which may be included in the compositions of the invention comprises those compounds or mixtures of compounds in which a functional group from one molecule may be caused to react with a different functional group of another molecule under the influence of a cationic catalyst. In such cases, high molecular weight materials will result when either a single molecule contains at least one functional group of each kind, or when two or more compounds are present, each of which contains at least two functional groups capable of reacting with the different functional groups of the other compound or compounds. Examples are compounds containing both norbornene rings and hydroxyl groups, and mixtures of compounds such as cyclic acetals formed from α,β-unsaturated aldehydes and polyhydric alcohols with polyhydroxylic compounds.

The invention includes within its scope non-hardenable compositions comprising, in addition to the aforesaid compounds or mixtures of compounds containing no 1,2-epoxide group but capable of being transformed to a higher molecular weight material under the influence of a cationic catalyst, and the aforesaid chelate compounds, compounds containing one 1,2-epoxide group per molecule or up to 10 mol percent of di- or poly-epoxy compounds. Examples of compounds containing one 1,2-epoxide group per molecule are styrene oxide, ethylene oxide, propylene oxide, butadiene monoxide, epichlorohydrin, epibromohydrin, butyl glycidyl ether, phenyl glycidyl ether, the cresyl glycidyl ethers, and the glycidyl ethers of alicyclic alcohols such as dihydrodicyclopentadienol and 2-hydroxyethyl dihydrodicyclopentadienyl ether; compounds containing an epoxy ring fused to an alicyclic residue such as dicyclopentadiene monoxide, cyclopentene oxide, cyclohexane oxide, or the epoxide derivatives of dihydrodicyclopentadienol or 2-hydroxyethyl dihydrodicyclopentadienyl ether.

In smoe cases, the compositions of the invention polymerise only slowly, but it has been found that, in such cases, polymerization can be considerably accelerated by the addition of a "co-catalyst." These are believed to undergo chemical reaction with the other constituents of the composition. The term "co-catalyst" is however preferred to "co-reactant," as the amount of additive which effectively accelerates polymerization is of the same order as that of the chelate catalyst and may, indeed, frequently be less. It will be appreciated that non-hardenable products are formed when the co-catalyst contains more than one 1,2-epoxide group per molecule, providing that the proportion of co-catalyst present is not more than 10 mol percent calculated on the amount of the compound capable of being transformed under the influence of a cationic catalyst to a higher-molecular weight material.

The di- and poly-epoxy resins which may be used in the compositions of this invention include, for example, di- and poly-glycidyl ethers of di- and poly-alcohols such as butane-1,4-diol, or glycerol, or of di- and poly-phenols such as resorcinol, pyrocatechol, hydroquinone, 1,4- and 1,5-dihydroxynaphthalones, bis(4-hydroxyphenyl)-methane, bis(4-hydroxyphenyl)methylphenylmethane, bis(4-hydroxyphenyl) - tolylmethanes, 4,4'-dihydroxydiphenyl, bis(4-hydroxyphenyl)sulfone and 2,2-bis(4-hydroxyphenyl)propane; condensation products of aldehydes with phenols (novolaks); diglycidyl esters of dicarboxylic acids such as phthalic acid; aminopolyepoxides such as are, for example, obtained by the dehydrohalogenation of the reaction products of epihalohydrins and primary amines such as n-butylamine, aniline or bis(4-methylaminophenyl)methane; and the products which are obtained by the complete or incomplete epoxidation of ethylenically-unsaturated cyclic or acyclic di- and poly-olefines.

According to the nature of the reactants involved, the products obtained in the absence of any compound containing a 1,2-epoxide group may assume a wide variety of forms. Different degrees of cross-linking may exist in the products, which may be fluid or viscous liquids, gums, rubbers, or flexible or rigid solids. The products may accordingly be used for a wide variety of purposes. Non-solid products may, for example be used as solvents, chemical intermediates, lubricants, greases, hydraulic fluids, waxes, textile-treating agents, diluents, plasticisers, as intermediates for synthetic resins and plastics, and for numerous other purposes. More solid products may be used in the filled or unfilled state, e.g. in the form of solutions or emulsions, as textile auxiliaries, laminating resins, varnishes, lacquers, dipping resins, casting resins, moulding compositions, and encapsulating, coating, filling and packing materials, adhesives, rubbers, foams and the like, as well as for the preparation of such materials.

The compositions of this invention may contain fillers, plasticisers or colouring agents, for example, asphalt, bitumen, glass fibers, mica, quartz powder, cellulose, kaolin, kieselguhr, finely-divided silica such as that available under the registered trade name "Aerosil," or metal powder.

The compositions of the present invention may if desired be used in association with other resins or plastics, which may, if desired, contain conventional hardeners or cross-linking agents.

The use of cationic catalysts, and in particular Lewis acids such as boron trifluoride or their complexes, to promote polymerisation is well known. However, such catalysts have in general the disadvantages that they are hygroscopic and are difficult or unpleasant to handle, i.e. they fume or liberate unpleasant halogen hydracids in atmospheres of normal humidity. The chelate catalysts used in the compositions of the present invention have the advantage that they are in general much less hygroscopic, have lower vapour pressures, and are more easy to handle and use than previously known cationic catalysts.

It is further believed that use of the catalysts of this invention leads to more readily controlled polymerisation.

By variation of the structures of the catalysts used in the compositions of the present invention, e.g. by suitable choice of the values and meanings of $Z$, $Z^1$, $X$, $Y$, $A$, hal, $m$, $n$, and $m^1$ in the above given formulae, a wide range of catalysts is available.

In the following examples, the components used in the compositions described, except where specifically indicated, are as follows Complex 1 was prepared as follows: boron trifluoride diethyl etherate (50 g.) was dissolved in dry toluene (125 ml.) and the mixture stirred and heated until slow distillation commenced. Dry o-hydroxyacetophenone (49 g.) was added dropwise during 30 minutes, and the distillation continued until no further hydrogen fluoride was evolved. On evaporation of the mixture to low bulk, the yellow solid chelate (56 g.) separated on cooling.

Complex 2 was prepared by reaction of boron trifluoride (47.3 g.) with o-hydroxypelargonophenone (78 g.) in the presence of toluene (150 ml.) substantially as described for complex 1. On complete evaporation of the solvent, there remained 94 g. of the liquid chelate.

Complex 3 was prepared as a mobile brown liquid by reaction of 2-methylnonane-4,6-dione with boron trifluoride, substantially as described for complex 1. The residual solution was washed twice with water, dried, and finally the solvent removed by warming gently in vacuo.

Complex 4 was prepared by treatment of acetoacetanilide (10 g.) with boron trifluoride-diethyl etherate (40 ml.) as described in J. Amer. Chem. Soc., 1948, 70, 1971, the complex being obtained as a white solid of M.P. 152–154° C.

Complex 5 was prepared by reaction of titanium tetrachloride with methyl salicylate, as described in J. Less-Common Metals, 1961, 3, 247.

Complex 6 was prepared by refluxing a mixture of stannic chloride (26 g.) with o-hydroxyacetophenone (13.6 g.) in benzene (100 ml.) until no more hydrogen chloride was evolved. The product was obtained as a solid on cooling the reaction mixture.

Complex 7, bis(pentane-2,4-dione) ferric chloride, was prepared by reaction of ferric chloride with ferric tris (acetylacetonate), as described in Nesmeyanov, A. N., Izbrannye Trudy, 1959, 2, 683. It was obtained as a red-brown powder, M.P. 190° C.

Complex 8, bis(pentane-2,4-diono) stannic dibromide, was prepared by reaction of stannic bromide with copper bis(acetylacetonate), as described in J. Chem. Soc., 1924, 125, 382, as a white solid, M.P. 182–186° C.

Complex 9 was prepared by reacting antimony pentachloride with acetylacetone, as described in Ber., 1903, 36, 1833.

Complex 10 was prepared by reacting nickel dimethylglyoxime with boron trifluoride diethyl etherate, as described in Chem. Ber., 1962, 95, 1438.

Complex 11 was prepared by treatment of complex 1 (1 mole), in acetone solution, with triethylamine (0.25 mole). The mixture was stirred overnight at room temperature, and then volatile material was removed in vacuo at 40° C. The product was obtained as a deep brown, semi-solid mass.

Complex 12 was prepared as follows: boron trifluoride diethyl etherate (50.4 g.) was dissolved in dry toluene (120 ml.) and the mixture stirred and heated until slow distillation commenced. Dehydroacetic acid (54.0 g.), suspended in dry toluene (530 ml.), was added dropwise at the same rate as the toluene distilled. When the mixture was evaporated to low bulk, the yellow solid chelate (38.4 g.) separated on cooling. The chelate had a M.P. 124–126° C. (Found: C, 44.09; H, 3.34. Calc. for $C_8H_7O_4BF_2$: C, 44.48; H, 3.27%.)

Monomer D was 3,3-bis(chloromethyl)-1-oxacyclobutane.

EXAMPLES 1–74

In order to demonstrate the activity of chelate complexes of the general Formula I as polymerisation catalysts, solutions of various monomers were treated with the complexes. The conditions and reactants used, and the results observed, are shown in Table I. The softening points of the polymers were determined using a Kofler bench. The following abbreviations are used:

ED = ethylene dichloride
MD = methylene dichloride

Epoxy resin A was prepared in a known way by the reaction of 2,2-bis-(4-hydroxyphenyl) propane was epichlorohydrin under alkaline conditions. It had an epoxy value of 5.2 epoxy equivalents per kg.

Monomer B was the epoxy alcohol obtained by hypochlorination and subsequent dehydrochlorination of 2-hydroxyethyl dihydrodicyclopentadienyl ether by the method described in Makromol. Chem. (1963), 59, 82–105.

Monomer C was the oxetane alcohol consisting essentially of the compound of formula:

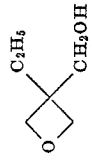

TABLE I

| Example No. | Monomer | Temp. (°C.) | Time (days) | Catalyst used | Mole percent of catalyst | Cocatalyst | Mole percent of cocatalyst | Solvent | Wt. of monomer in 100 mls. solvent, g. | Percent yield of polymer | Appearance or softening point (°C.) of polymer |
|---|---|---|---|---|---|---|---|---|---|---|---|
| 1 | Styrene | 0 | 30 | 1 | 5 | | | ED | 40 | 10 | 114. |
| 2 | α-Methylstyrene | 0 | 30 | 1 | 5 | | | ED | 48 | 97 | 98. |
| 3 | Indene | 0 | 30 | 1 | 5 | | | ED | 48 | 40 | 203. |
| 4 | Anethole | 0 | 30 | 1 | 5 | | | ED | 56 | 48 | 265. |
| 5 | Isoprene | 0 | 30 | 1 | 5 | | | ED | 28 | 100 | Liquid. |
| 6 | Styrene | 0 | 30 | 1 | 5 | Epichlorohydrin | 10 | ED | 40 | 75 | 112. |
| 7 | α-Methylstyrene | 0 | 30 | 1 | 5 | do | 10 | ED | 48 | 46 | 82. |
| 8 | Indene | 0 | 30 | 1 | 5 | do | 10 | ED | 48 | 4 | 217. |
| 9 | Anethole | 0 | 30 | 1 | 5 | do | 10 | ED | 56 | 100 | 262. |
| 10 | Isoprene | 0 | 30 | 1 | 5 | do | 10 | ED | 28 | | Liquid. |
| 11 | Styrene | 0 | 30 | 1 | 5 | N-vinyl carbazole | 5 | ED | 40 | 15 | 232. |
| 12 | α-Methylstyrene | 0 | 30 | 1 | 5 | do | 5 | ED | 48 | 4 | 115. |
| 13 | Indene | 0 | 30 | 1 | 5 | do | 5 | ED | 48 | 16 | 228. |
| 14 | Anethole | 0 | 30 | 1 | 5 | do | 5 | ED | 56 | 66 | >260. |
| 15 | Isoprene | 0 | 30 | 1 | 5 | do | 5 | ED | 28 | 12 | 190. |
| 16 | Styrene | 0 | 30 | 1 | 5 | n-Butyl vinyl ether | 5 | ED | 40 | 5 | 40. |
| 17 | α-Methylstyrene | 0 | 30 | 1 | 5 | do | 5 | ED | 48 | 7 | 40. |
| 18 | Indene | 0 | 30 | 1 | 5 | do | 5 | ED | 48 | 90 | 187. |
| 19 | Anethole | 0 | 30 | 1 | 5 | do | 5 | ED | 56 | 70 | 189. |
| 20 | Isoprene | 0 | 30 | 1 | 5 | do | 5 | ED | 28 | Low | Liquid. |
| 21 | Styrene | 0 | 30 | 1 | 5 | Methylbutadienyl ether | 5 | ED | 40 | 10 | 189. |
| 22 | α-Methylstyrene | 0 | 30 | 1 | 5 | do | 5 | ED | 48 | Low | Liquid. |
| 23 | Indene | 0 | 30 | 1 | 5 | do | 5 | ED | 48 | 97 | 92. |
| 24 | Anethole | 0 | 30 | 1 | 5 | do | 5 | ED | 56 | 80 | 132. |
| 25 | Isoprene | 0 | 30 | 1 | 5 | do | 5 | ED | 28 | Low | Liquid. |
| 26 | Styrene | 20 | 30 | 1 | 1 | | | | 48 | | Solid. |
| 27 | Indene | 20 | 30 | 1 | 1 | | | | 48 | | Do. |
| 28 | Anethole | 20 | 3 | 1 | 1 | | | | 56 | 98 | Do. |
| 29 | Norbornadiene | 20 | 30 | 2 | 1 | | | | | | Black solid. |
| 30 | Dicyclopentadiene | 20 | 30 | 2 | 1 | | | | | | Do. |
| 31 | Styrene | 20 | 30 | 6 | 2 | | | | | | Very viscous liquid. |
| 32 | α-Methylstyrene | 20 | 30 | 6 | 2 | | | | | | Liquid. |
| 33 | Indene | 20 | 30 | 6 | 2 | | | | | | Do. |
| 34 | Anethole | 20 | 30 | 6 | 2 | | | | | 98 | Viscous liquid. |
| 35 | Isoprene | 20 | 30 | 6 | 2 | | | | | | Solid liquid. |
| 36 | Norbornadiene | 20 | 30 | 6 | 2 | | | | | | Do. |
| 37 | Dicyclopentadiene | 20 | 30 | 6 | 2 | | | | | | Solid. |
| 38 | Anethole | 80 | 3 | 3 | 5 | | | ED | 40 | | Liquid. |

TABLE I—Continued

| Ex. | Monomer | Temp. (°C.) | Time (days) | Catalyst used | Mole percent of catalyst | Cocatalyst | Mole percent of cocatalyst | Solvent | Wt. of monomer in 100 mls. solvent, g. | Percent yield of polymer | Appearance or softening point (°C.) of polymer |
|---|---|---|---|---|---|---|---|---|---|---|---|
| 39 | n-Butyl vinyl ether | 0 | 30 | 3 | 5 | | | | | | Do. |
| 40 | Iso-butyl vinyl ether | 20 | 30 | 3 | 5 | | | | | | Do. |
| 41 | Hexachloro-bicyclo (2,2,1) hept-2-enyl vinyl ether | | | | | | | | | | Viscous liquid. |
| 42 | N-vinyl-carbazole | 20 | 30 | 3 | 2 | | | | | | Solid. |
| 43 | Monomer D | 20 | 30 | 3 | 2 | | | | | | Do. |
| 44 | do | 20 | 15 | 3 | 1 | Monomer B | 1 | | | | Do. |
| 45 [2] | do | 80 | 0.8 | 3 | 0.8 | | | | | | Do. |
| 46 | do | 20 | 6 | 1 | 5 | | | MD | 75 | 82 | 154. |
| 47 | do | 20 | 6 | 1 | 10 | | | MD | 75 | 86 | 158. |
| 48 | Tetrahydrofuran | 20 | 5 | (4) | 1 | | | MD | 75 | 90 | 158. |
| 49 [5] | 1,4-epoxy-cyclohexane | 0 | 5 | 1 | 1 | Epichlorohydrin | 1.5 | | | 85 | Liquid. |
| 50 [5] | Tetrahydrofuran | 0 | 3 | 1 | 1 | do | 2 | | | 60 | Do. |
| 51 | Monomer C | 0 | 3 | 1 | 1 | Epoxy resin A | 0.3 | | | 100 | Do. |
| 52 [7] | do | 20 | 3 | 1 | 1 | | | | | | 100. |
| 53 | do | 20 | 3 | 8 | 5 | | | | | | Rubbery solid. |
| 54 | do | 20 | 3 | 9 | 5 | | | | | | Do. |
| 55 [7] | do | 20 | 3 | 10 | 5 | | | | | | Do. |
| 56 [7] | do | 20 | 3 | 5 | 5 | | | | | | Do. |
| 57 | Trioxan | 20 | 3 | 6 | 5 | | | | | | Do. |
| 58 | do | 65 | 0.25 | 4 | 0.13 | | | ED | 180 | 88 | Infusible solid. |
| 59 [8] | do | 65 | 0.25 | 1 | 0.1 | | | ED | 180 | 69 | Do. |
| 60 [8] | Benzyl chloride | 100 | 1 | 1 | 2 | | | | | | Liquid. |
| 61 | Di-isobutylene | 100 | 1 | 3 | 2 | Epichlorohydrin | 10 | ED | 44.8 | | Do. |
| 62 | Cyclohexene | 0 | 30 | 1 | 5 | do | 10 | ED | 32.8 | | Solid. |
| 63 | Acenaphthylene | 0 | 30 | 1 | 5 | do | 10 | ED | 60.8 | | Do. |
| 64 | Divinylbenzene | 0 | 30 | 1 | 5 | do | 10 | ED | 52 | | Do. |
| 65 [2] | Divinyl ether | 0 | 30 | 1 | 5 | do | 10 | ED | 28 | | Do. |
| 66 | Myrcene | 0 | 30 | 1 | 5 | do | 10 | ED | 54.4 | | Rubbery solid. |
| 67 | Divinyl dioxan | 0 | 30 | 1 | 5 | do | 10 | ED | .66 | | Oil. |
| 68 | Dioxalan | 0 | 30 | 1 | 5 | do | 10 | ED | 29.6 | | Oil. |
| 69 | Diketen | 0 | 30 | 1 | 5 | do | 10 | ED | 33.6 | | Black solid. |
| 70 | Furfural | 0 | 30 | 1 | 5 | do | 10 | ED | 38.4 | | Oil. |
| 71 | β-Phene | 0 | 30 | 1 | 5 | do | 10 | ED | 54.4 | | Black solid. |
| 72 | Acrolein dimer | 0 | 30 | 1 | 5 | do | 10 | ED | 44.8 | | Oil. |
| 73 | Limonene | 0 | 30 | 1 | 5 | do | 10 | ED | 52.8 | | |
| 74 | Cyclopentadiene | 0 | 30 | 1 | 5 | do | 10 | ED | 26.4 | | Rubbery solid. |

[1] Catalyst was used as a 33% w./w. solution in γ-butyrolactone.
[2] Induction period.
[3] For purposes of comparison.
[4] No polymerization occurred with less than 0.01 mole percent of cocatalyst.
[5] Product was a light yellow clear rubber.
[6] Product was a hard colourless solid, soluble in alcohol or dioxan.
[7] Catalyst was used as a 25% w./w. solution in γ-butyrolactone.
[8] Product was an amorphous, infusible polymer, insoluble in chloroform.
*BF₂ etherate.

EXAMPLE 75

Diphenyl ether was chloromethylated in the following manner:

A mixture of diphenyl ether (170 g.), paraformaldehyde (198 g.), zinc chloride (68 g.) and concentrated hydrochloric acid (1 litre) was stirred at 90°–95° C. for 20 hours, a stream of hydrogen chloride gas being continually passed through. On cooling, a heavy oil separated, which was extracted into ether. After drying with sodium sulphate, the ether solution was evaporated, yielding 275 g. of a yellow liquid, containing 29.35% Cl.

The product was mixed with 1% by weight of complex 6, and the mixture was heated at 120° C.; a dark brown, solid, infusible foam was formed within 10 minutes. The same result was observed when 1% by weight of complexes 7 or 8 was used in place of complex 6.

EXAMPLES 76–84

(3,4 - dihydro - 2H-pyran-2-yl)methyl 3,4-dihydro-2H-pyran-2-carboxylate was prepared by treatment of "acrolein dimer" with aluminium isopropoxide, as described in Example II of U.S. Patent No. 2,537,921.

The bis(dihydropyran) was hardened by means of various chelates, the properties of the hardened materials being given in Table II. The chelates were used at 33% solutions in γ-butyrolactone. The term "Martens value" denotes that obtained by a modification of the D.I.N. procedure wherein a smaller sample is employed. Results obtained by this modified procedure, although only approximating to those obtained in the D.I.N. procedure, provide, however, mutually comparable results.

TABLE II

| Catalyst used | Amount of catalyst (percent w./w. on the bis-dihydro-pyran) | Curing conditions (° C.) | Properties of hardened material | |
|---|---|---|---|---|
| | | | Martens value (° C.) | Appearance |
| Examples: | | | | |
| 76 | 4 | 2 | 120°/18 hours | 180 | Brown. |
| 77 | 4 | 2 | 120°/18 hours plus 180°/24 hours | 205 | Do. |
| 78 | 1 | 2 | 20°/24 hours plus 120°/18 hours | 218 | Do. |
| 79 | 4 | 2 | 100°/3 hours | 211 | Do. |
| 80 | 4 | 2 | 80°/18 hours plus 100°/3 hours | 215 | Faint yellow. |
| 81 | 4 | 2 | 60°/18 hours plus 100°/3 hours | 213 | Colourless. |
| 82 | 11 | 2 | 20°/72 hours plus 80°/4 hours | 194 | Brown. |
| 83 | 11 | 6 | 20°/72 hours | 134 | Do. |
| 84 | 12 | 2 | 90°/6 hours | 193 | Pale yellow. |

EXAMPLE 85

A mixture of complex 1 (18.4 g., 0.1 mole) and acetone (118 g., 2 moles) was heated under reflux for 18 hours. The excess of acetone was then removed by vacuum distillation; 109.5 g. of acetone was recovered. The residual material, a black sludge, had B.P. >40°/15 mm.; it was extracted in a Soxhlet apparatus with carbon tetrachloride. On evaporation of the solvent, 1 g. of viscous liquid product remained.

EXAMPLE 86

A mixture of crotonaldehyde (35 g., 0.5 mole), benzene (160 ml.) and complex 1 (1.75 g.) was heated for 1 week in an apparatus fitted with a Dean-Stark water trap; 4 ml. of water were collected. The mixture was cooled, and hexane was added; filtration yielded 12.5 g. of a brown solid having a molecular weight of approximately 1000.

EXAMPLE 87

A mixture of 3,9-divinyl-2,4,8,10-tetraoxaspiro [5,5] undecane (21.2 g.), glycerol (6.2 g.) and complex 4 (0.55 g.) was heated at 100° C.; after 20 minutes, a brown infusible product was obtained. A hardened product was similarly obtained when the spiro compound and the complex were heated alone at 100° C. for 30 minutes.

EXAMPLES 88

Bicyclo [2,2,1] hept-5-enn-2-ol (11 g.) was heated with complex 4 for 1 day at 100° C. and then for 1 day at 150° C. The resulting solid product had a hydroxyl group content of only 0.8 eq./kg., and its infra-red spectrum showed only weak bands at about 3330 (OH) and 3040 (C=C) cm$^{-1}$.

EXAMPLE 89

Di(bicyclo [2,2,1] hept 5-en-2-yl) succinate (15.1 g.), glycerol (3.1 g.) and complex 4 (0.91 g.) were mixed and heated for 1 day at 100° C. and then for 1 day at 150° C. On cooling, a brown, almost solid, product was obtained. This had a hydroxyl content of only 1.04 eq./kg. (the theoretical value, assuming no reaction to have occurred, is 4.84), and its infra-red spectrum showed only rather weak OH and C=C bands.

EXAMPLE 90

A mixture of linseed oil (13.3 g.) and complex 4 (0.92 g.) was heated at 105° C. for 4 days. During this time, the iodine value decreased from 190.5 to 136, i.e. partial polymerisation occurred.

EXAMPLE 91

Linoleic acid (28 g.) and complex 4 (0.92 g.) were mixed and heated at 105° for 3 days; the iodine value fell from 165.5 to 142.3.

EXAMPLE 92

A solution of complex 9 (1.8 g.) in γ-butyrolactone (3.6 g.) was added to a mixture of tetrahydrofuran (7.2 g.), epichlorohydrin (0.78 ml.), and ethylene dichloride (25 ml.). The resulting mixture was kept at 0° C. for 1 day and then at 20° C. for 30 days. Addition of 10% aqueous methanol gave a brown precipitate; this was filtered off, and the filtrate was saturated with sodium chloride and extracted with ether (4× 100 ml.). The combined ethereal extracts were dried over anhydrous sodium sulphate and filtered; evaporation of solvent left a brown viscous oil, whose infra-red spectrum showed that C—O—C and OH groups were present.

What is claimed is:

1. A composition of matter comprising (1) a compound containing at least two vinyl ether groups, said compound consisting only of carbon, hydrogen and oxygen and being free from 1,2-epoxy groups, and (2) a chelate compound in which the coordinating atom is bound by at least one of its valencies to a halogen atom selected from the class consisting of fluorine, chlorine and bromine, and in which the coordinating atom is also bound by at least one of its valencies to a member selected from the class consisting of oxygen atom and sulfur atom.

2. A composition of matter comprising (1) a compound containing at least two vinyl ether groups, said vinyl ether groups forming part of a heterocyclic ring wherein the heteroatom is oxygen, said compound consisting only of carbon, hydrogen and oxygen and being free from 1,2-epoxide groups and (2) a chelate compound in which the coordinating atom is bound by at least one of its valencies to a halogen atom selected from the class consisting of fluorine, chlorine and bromine, and in which the coordinating atom is also bound by at least one of its valencies to a member selected from the class consisting of oxygen atom and sulfur atom.

3. A composition of matter comprising (1) a poly(2,3-dihydro)-2H-pyranyl compound, said compound consisting only of carbon, hydrogen and oxygen and being free from 1,2-epoxide groups and (2) a chelate compound in which the coordinating atom is bound by at least one of its valencies to a halogen atom selected from the class consisting of fluorine, chlorine and bromine, and in which the coordinating atom is also bound by at least one of its valencies to a member selected from the class consisting of oxygen atom and sulfur atom.

4. A composition of matter comprising (1) a compound selected from the group consisting of 3,4-dihydro-2H-pyran-2-yl)methyl 3,4 - dihydro-2H-pyran-2-carboxylate and prepolymers thereof and (2) a chelate compound in which the coordinating atom is bound by at least one of its valencies to a halogen atom selected from the class consisting of fluorine, chlorine and bromine, and in which the coordinating atom is also bound by at least one of its valencies to a member selected from the class consisting of oxygen atom and sulfur atom.

5. A composition of matter comprising (1) a compound selected from the group consisting of 3,4-dihydro-2H-pyran-2-yl)methyl 3,4-dihydro-2H-pyran-2-carboxylate and prepolymers thereof and (2) a chelate of the formula

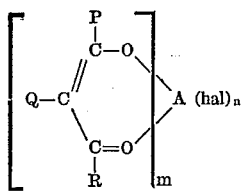

wherein A is a coordinating atom selected from the class consisting of boron, aluminum, gallium, indium, zinc, titanium, zirconium, $tin^{IV}$, $iron^{III}$, $vanadium^{IV}$ and $antimony^{V}$, "hal" is a halogen atom selected from the class consisting of fluorine, chlorine and bromine, P is a member selected from the class consisting of alkyl group of 1 to 6 carbon atoms and the phenyl group, Q is a member selected from the class consisting of hydrogen atom, alkyl group of 1 to 6 carbon atoms, alkenyl group, benzyl group and (2-carbomethoxy) alkyl group, R is a member of the class consisting of alkyl group of 1 to 6 carbon atoms, the phenyl group, the acetoxy-phenyl group, the group

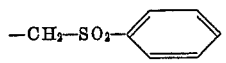

and the group

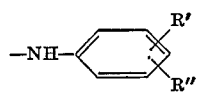

wherein R' and R'' each is a member of the class consisting of hydrogen and chlorine, and together Q and R form a member selected from the class consisting of trimethylene group and tetramethylene group, $m$ is an integer of at least 1 and at most 3, $m$ is an integer of at least one and at the most 4, the value of $2m+n$ being the coordination number of the atom A.

6. A composition of matter comprising (1) a compound selected from the group consisting of 3,4-dihydro-2H-pyran-2-yl)methyl 3,4-dihydro-2H-pyran-2-carboxylate and prepolymers thereof and (2) a chelate compound of the formula

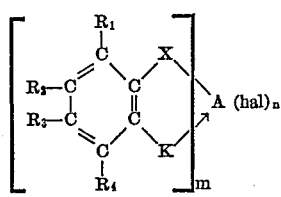

wherein A is a coordinating atom selected from the class consisting of boron, aluminum, gallium, indium, zinc, titanium, zirconium, $tin^{IV}$, $iron^{III}$, $vanadium^{IV}$, and $antimony^{V}$, "hal" is a halogen atom selected from the class consisting of fluorine, chlorine and bromine, X is a member selected from the class consisting of oxygen and sulfur, K is a member selected from the class consisting of nitro group, nitroso group, the carboxyl group, the group

a group

a group

a group

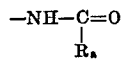

and a group

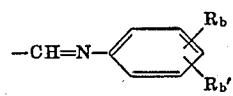

$R_a$ being an alkyl group of at least 1 and at the most 2 carbon atoms, $R_b$ and $R_b'$ each being selected from the class consisting of hydrogen, halogen and alkyl, $R_1$, $R_2$, $R_3$ and $R_4$ each is a member selected from the class consisting of hydrogen, alkyl group and nitro group, and together $R_2$ and $R_3$ form the divalent radical

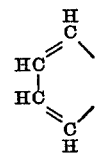

$m$ is an integer of at least 1 and at the most 3, $n$ is an integer of at least 1 and at the most 4, the value of $2m+n$ being the coordination number of the atom A.

References Cited

UNITED STATES PATENTS

| | | |
|---|---|---|
| 2,514,156 | 7/1950 | Geyer et al. |
| 2,537,921 | 1/1951 | Smith. |
| 3,014,939 | 12/1961 | Kluiber. |
| 3,205,183 | 9/1965 | Vandenberg. |
| 3,231,597 | 1/1966 | Fischer. |

FOREIGN PATENTS

| | | |
|---|---|---|
| 581,181 | 8/1959 | Canada. |

HARRY WONG, JR., Primary Examiner

U.S. Cl. X.R.

260—2, 2.5, 41, 46.5, 47, 63, 67, 77.5, 78.4, 79.7, 80, 80.3, 82.1, 85.5, 86.1, 88.1, 88.2, 88.3, 88.5, 88.7, 89.5, 89.7, 91.1, 91.7, 92.1, 92., 93.1, 93.3, 93.5, 93.7, 94.2, 94.3, 94.8, 94.9, 429.3, 429.5, 429.7, 429.9, 439, 448, 606.5

CASE ARL-103

PO-1050
(5/69)

UNITED STATES PATENT OFFICE
CERTIFICATE OF CORRECTION

Patent No. 3,458,483        Dated July 29, 1969

Inventor(s)    GEORGE JON DUBSKY ET AL

It is certified that error appears in the above-identified patent and that said Letters Patent are hereby corrected as shown below:

Column 15, line 37, after "and at most 3," delete "m" and substitute --- n ---.

SIGNED AND SEALED
DEC 8 1970

(SEAL)
Attest:

Edward M. Fletcher, Jr.
Attesting Officer

WILLIAM E. SCHUYLER, JR.
Commissioner of Patents